United States Patent [19]

Binder et al.

[11] Patent Number: 5,622,710
[45] Date of Patent: Apr. 22, 1997

[54] ANIMAL FEED ADDITIVE BASED ON FERMENTATION BROTH, A PROCESS FOR ITS PRODUCTION AND ITS USE

[75] Inventors: Wolfram Binder, Rodenbach; Franz-Ludwig Dahm, Alzenau; Ulrich Hertz, Bruchköbel; Heinz Friedrich, Hanau; Hermann Lotter, Altenstadt; Wolfgang Hohn, Gründau; Dieter Greissinger, Niddatal; Wolfgang Polzer, Gründau, all of Germany

[73] Assignee: Degussa Aktiengesellschaft, Frankfurt am Main, Germany

[21] Appl. No.: 518,222

[22] Filed: Aug. 23, 1995

Related U.S. Application Data

[63] Continuation of Ser. No. 213,637, Mar. 16, 1994, abandoned.

[30] Foreign Application Priority Data

Mar. 17, 1993 [DE] Germany ............ 43 08 498.2

[51] Int. Cl.⁶ .................. A61K 9/20; A23K 1/00
[52] U.S. Cl. ................ 424/438; 424/484; 426/2; 426/69
[58] Field of Search .............. 424/438, 484; 426/2, 69

[56] References Cited

U.S. PATENT DOCUMENTS

| | | | |
|---|---|---|---|
| 4,181,709 | 1/1980 | Dannelly | 424/438 |
| 4,777,051 | 10/1988 | Nagano et al. | 426/61 |
| 4,876,096 | 10/1989 | Autant et al. | 424/438 |
| 5,133,976 | 7/1992 | Rouy | 426/2 |

FOREIGN PATENT DOCUMENTS

| | | |
|---|---|---|
| 1220663 | 4/1987 | Canada .............. 424/438 |
| 9533039 | 9/1991 | European Pat. Off. . |
| 0491638 | 12/1991 | European Pat. Off. . |

OTHER PUBLICATIONS

Database WPI, Week 9320, Derwent Publications Ltd., London, GB; AN 93-165415 & SU-A-1 735 365 (Kiev Poly), 23 May 1992.

Database WPI, Week 7734, Derwent Publications Ltd., London, GB; AN 77-59948Y & JP-A-52 081 259 (Asahi Chemical Ind KK), 7 Jul. 1977.

*Primary Examiner*—Raj Bawa
*Attorney, Agent, or Firm*—Cushman Darby & Cushman IP Group of Pillsbury Madison & Sutro LLP

[57] ABSTRACT

An animal feed additive comprising stable pellets is produced by pelletizing from a fermentation broth containing an animal feed additive with at least 33% by weight of the fermentation products present. The pellets can be produced particularly effectively by pelletizing providing they are built up from at least 30% by weight of fine particles of which at least 70% by weight are smaller than 100 μm in size. The biomass may be completely present, partly present or not present at all in the pellets.

9 Claims, No Drawings

ANIMAL FEED ADDITIVE BASED ON FERMENTATION BROTH, A PROCESS FOR ITS PRODUCTION AND ITS USE

This is a continuation of application Ser. No. 08/213,637, filed on Mar. 16, 1994, which was abandoned upon the filing hereof.

The present invention relates to a new animal feed additive with a high content of at least one fermentation product, to a process for its production and to its use.

BACKGROUND OF THE INVENTION

Animal feeds are supplemented with individual amino acids according to the needs of the animals. For supplementing animal feeds with L-lysine for example, L-lysine monohydrochloride with an L-lysine content of 78% has hitherto been used in by far the majority of cases. To produce the monohydrochloride, the L-lysine, which is prepared by fermentation, first has to be separated from all other constituents of the crude fermentation broth in complicated process steps, subsequently converted into the monohydrochloride and crystallized. A large number of secondary products and the reagents required for working up accumulate as waste. Since high purity is not always required of the animal feed supplement and since, in addition, the secondary fermentation products often contain substances of nutritive value, there has been no shortage of attempts in the past to avoid the expensive production of feed-quality amino acids, more particularly pure L-lysine monohydrochloride, and to convert the crude fermentation broth less expensively into a solid animal feed. Unfortunately, none of these attempts has produced an economically useful result.

A serious disadvantage has been the complex composition of such media because, in general, they are difficult to dry, are hygroscopic, do not flow freely and are susceptible to agglomeration, and they are unsuitable for technically demanding processing in mixed feed factories. Above all, fermentation products of lysine are particularly disadvantageous in this regard. The simple removal of water from the crude fermentation broth by spray drying leads to a dusty, highly hygroscopic concentrate which forms lumps after only brief storage and which cannot be used as an animal feed in this form.

In order to obtain a free-flowing, storable product, a large quantity of various additives has to be incorporated in the concentrate. However, this further reduces the often already relatively low content of the amino acid. One such product is described, for example, in Published German Patent Application DE-OS 23 57 119, according to which a concentrate is prepared from the fermentation broth, optionally after removal of the biomass, and auxiliary substances are subsequently added to the concentrate thus prepared. Alternatively, the lysine may also be released from the concentrate by precipitation with methanol. Additive-containing feed supplements produced by fermentation are also described in DD 139 205, in Upr. Mirkrobn. Sint. 111–118 (1973), in CA 105 (19): 170542g, in DE 30 32 618 (U.S. Pat. No. 4,327,118) and in Patent CS 250 851.

European Patent EP 122 163 (U.S. Pat. No. 5,133,976) describes a process by which it is possible under special fermentation conditions to obtain a crude fermentation broth which can be dried to form a solid and stable product. However, in this case, too, the L-lysine content is only 35 to 48% by weight. It is also known from these documents that the removal of water by azeotropic distillation with paraffin oil leads to acceptable products. However, this process is also complicated and expensive. Tetrachloromethane, which is toxicologically unsafe, has also been similarly used (CS 164 706).

The use of a spray dryer with an integrated fluidized bed gives a fine-particle and porous, but free-flowing granular product of very low apparent density and high hygroscopicity. The handling of this product is accompanied by serious dust emission.

Pelletizing in a fluidized bed has also proved to be unsuitable because it also involves the use of additives which, according to Patent DD 268 865, are continuously added. The use of the additives is essential to bind the water from the fermentation broth so as to prevent the pellets from agglomerating which would have a particularly adverse effect on pelletizing.

SUMMARY OF THE INVENTION

Accordingly, the object of the present invention is to provide an animal feed additive which contains a fermentation product in high concentrations as its active substance but which is free from troublesome secondary products. The additive should be inexpensive to produce and, as an end product, would be substantially non-hygroscopic and non-tacky and, in particular, would have an apparent density of at least 550 kg/m$^3$. In addition, its active substance content would lend itself to standardization by simple means. The present invention also relates to a process for the production of the animal feed additive, to an animal feed or premix and to its use.

In accordance with the present invention, there is provided an animal feed additive based on fermentation broth and containing a fermentation product and the majority of the other ingredients of the fermentation broth, 0 to 100% of the fermentation biomass being present. The animal feed additive of the invention is in pellet form and contains at least 33% by weight of the fermentation product.

The animal feed additive according to the invention is based on fermentation broth, i.e. it contains a fermentation product which is the required active substance, such as for example an amino acid or a medication, and the majority of the other ingredients (except for fermentation biomass) of the fermentation broth, the fermentation biomass in turn being present to a level of 0 to 100%. If desired, the animal feed additive may be reduced in the biomass, but contains the majority of the other substances present in the fermentation broth in addition to the fermentation product and the biomass. If these other substances are largely separated off by such techniques as, for example, crystallization, chromatography, etc., pelletizing of the fermentation product does not present significant difficulties and is already being carried out on an industrial scale.

According to the invention, the animal feed additive is in the form of pellets, i.e. it is built up into pellets from fine particles. According to the invention, it has been found in this connection that the formation of pellets is favorable above all when the fermentation product is largely contained in the pellets. Above 33% by weight of fermentation product (the active substance) in the pellets, the formation of pellets has advantages over other forms of granulation, for example azeotropic removal of the water, grinding or size-reducing an optionally dough-like cake. The pellets preferably contain at least 40% by weight and, more preferably, at least 45% by weight of the fermentation product, the upper limit normally being at 90% by weight due to the other ingredients of the fermentation broth still present. According to the invention, some of these other ingredients are actually desirable and crucial to the invention because they have tacky properties and help to bind the fermentation product in the pellets. The upper limit of 90% by weight applies to the pure fermentation product; if it is converted into salt form for example, as in the case of lysine, the upper limit is lower corresponding to the percentage salt content, the percentage content of minerals increasing accordingly.

According to the invention, it has also been found that an animal feed additive in the form of pellets of at least 30% by weight fine particles is particularly advantageous. The fine particles are a powder of which at least 70% by weight has a particle size of <100 μm.

The pellets may be built up from 100% fine particles (all percentages are based on dry matter, unless otherwise stated), for example with addition of water. In one particularly advantageous embodiment, however, the pellets are built up from at most 99% by weight fine particles and the fermentation broth is added as binder. In this case, the fermentation broth may be used directly, in diluted form, in concentrated form or as a dissolved or suspended dry product. It is of particular advantage to use dissolved dry product, optionally in or with original fermentation broth or fermentation broth concentrate. The dry product of the fermentation broth to be dissolved advantageously consists of oversize or undersize particles of the animal feed additive. Pellets built up in this way contain several fine particles for every pellet particle as the base particle of the pellets. Pelletizing in this way is preferable to pelletizing in a fluidized bed, where a pellet particle is essentially built up from each fine particle, because pellets of relatively high apparent density can unexpectedly be obtained in this way.

At least 70% by weight of the pellets according to the invention are at least 100 μm in size, the percentage of pellets smaller than 100 μm in size being less than 10% by weight and, with particular advantage, less than 3% by weight. This can be achieved by sieving, all undersize pellets being returned to the pelletizing stage. In one advantageous embodiment, 90% by weight of the pellets according to the invention are smaller than 5 mm in size, preferably smaller than 2 mm in size and, with particular advantage, no larger than 1 mm in size. If 1 mm is taken as the upper limit, at least 75% by weight of the pellets are preferably in that range.

As already mentioned, the animal feed additives according to the invention may be pelletized with water or fermentation broth (obtained as described above). Where fermentation broth is used, it may contain all or part of the biomass or none of the biomass at all. The same applies to the product as a whole. It is of particular advantage in this case and in the product as a whole if the biomass is predominantly present, i.e. if preferably up to 100% or close to 100% of the biomass is present.

Fermentation broths containing a medication or an amino acid as the fermentation product are particularly suitable as the base of the animal feed additive. In a particularly preferred embodiment, chlorotetracycline is present as the medication while lysine, threonine or tryptophane is present as the amino acid. The pellets according to the invention can be produced particularly effectively with these products as the fermentation product.

As already mentioned, the animal feed additives according to the present invention should have a high apparent density, the products according to the invention—which either contain at least 33% by weight of the fermentation product or are made up of pellets of at least 30% by weight of fine particles of which at least 70% by weight are smaller than 100 μm in size or, with particular advantage, embody all these features—advantageously being produced when an apparent density of at least 550 kg/m³ is to be established. Lower apparent densities can also be established by conventional processes, for example azeotropic removal of water with paraffin oil or spray drying, spray drying (in addition to other processes) also leading to the fine particles mentioned above.

In a particularly advantageous embodiment, the animal feed additives according to the invention are pelletized using high-shear mixing tools, the mixing tools advantageously acting on fine particles and, as described above, building up the pellets therefrom. The binders mentioned above (water or fermentation broth) are again preferably used. For example, pelletizing of fine particles in pan granulators and, more particularly, in mixers, advantageously intensive mixers, is suitable. In high-shear mixers such as these, the fine particles and the pellets impact on the mixer wall and on any mixing blades or the like present which, in the case of the product according to the invention, lead to a high density, more particularly of at least 550 kg/m³ and generally in the range from 550 to 850 kg/m³, and to high stability, i.e. to high abrasion resistance of the pellets. As already mentioned, the fine particles are advantageously a spray-dried powder which is easy to obtain and which is particularly suitable for the production of the pellets according to the invention.

If water or fermentation broth is added during the pelletizing process, pelletizing may optionally be accompanied by drying.

In the case of an amino acid additive, the animal feed additive according to the invention based on fermentation broth preferably has the following dry matter composition:

| Free supplement amino acid(s) | | 40–90% by weight |
|---|---|---|
| Proteins | maximum | 0.5–20% by weight |
| Carboxylic acids containing less than 8 carbon atoms | maximum | 13% by weight |
| Total sugars | maximum | 10% by weight |
| Fats and oils | maximum | 6% by weight |
| Minerals | maximum | 3–30% by weight. |

This product preferably contains all the ingredients of the fermentation broth with the possible exception of part of the biomass and generally the mechanically removable products.

The animal feed additive according to the invention preferably contains one of the following components within the range indicated:

| Proteins | 10–16% by weight |
|---|---|
| Carboxylic acids containing less than 8 carbons | max. 8% by weight |
| Total sugars | 2–10% by weight |
| Minerals | 5–25% by weight. |

The product normally has a residual water content of at least 0.5% by weight to avoid lump formation although the water content should not exceed 5% by weight and, at most, 10% by weight.

The protein content is determined from the total nitrogen content minus the inorganic nitrogen minus the nitrogen content of the free amino acids and multiplication of the value obtained by a factor of 6.25 ((total N % - inorg. N % - AA N %)×6.25). The total nitrogen content is determined by Kjeldahl's digestion (standard method); the inorganic nitrogen content (ammonium content) is determined, for example, by colorimetry, titrimetry or potentiometry; the nitrogen content of the free amino acid is determined by quantitative analysis of the free amino acids (amino acid analyzer (AAA)) with subsequent calculation of the N content. In the content of the invention, minerals are understood to be the inorganic cations and anions together.

The protein content of the pellets according to the invention is normally between 0.5 and 20% by weight. According to the invention, the proteins may also be used to increase the stability of the pellets. Accordingly, a lower limit of 0.5% by weight is desirable, particularly favorable pellets being obtained with higher protein contents of 8 to 18% by weight and, more particularly, above 10% by weight.

The additives according to the invention normally contain up to 20% by weight of fermentation biomass.

High amino acid contents of up to at most 90% by weight of the theoretical can be obtained, for example, in the preparation of the L-threonine with *Escherichia coli* BKIIM B-3996 (FR-A 2 640 640 - U.S. Pat. No. 5,175,107), particularly by virtue of the relatively simple media in this case.

In the preparation of lysine or tryptophane with *Corynebacterium glutamicum* or *Escherichia coli* K12 derivatives, the amino acid content is generally somewhat lower; in the particular case of tryptophane, maximum contents of 70% by weight are typical of fermentation at the present time.

Accordingly, the invention encompasses animal feed additives which, in addition to an active substance (the fermentation product), for example one or more amino acids or a medication, for example chlorotetracycline, contain all or at least the majority of the ingredients of the fermentation broth associated with the fermentation product; and animal feed additives which have the same composition as above, but with all of the biomass, part of the biomass or none of the biomass at all.

The additives according to the invention may be directly obtained, for example by spray drying of a fermentation broth. In general, however, this only gives porous, fine spray-dried particles with an apparent density of less than 550 kg/m$^3$. These supplements are susceptible to agglomeration and hence are not optimally suitable for processing in mixed feed factories.

According to the invention, it has been found that, on the one hand, pellets having the required size (normally between 0.1 and 1 mm) which combine a very high apparent density with reduced hygroscopicity can be obtained by pelletizing the fine-particle powder as already mentioned in pan granulators or in mixers, more particularly using additional high-shear mixing tools and, in particular, with a concentrate of the fermentation broth as binder.

The pellets according to the invention are generally compact, substantially spherical particles which are eminently suitable for use in animal feeds. Oversize material and/or fines are normally removed by sieving, so that the pellets are present in a generally desirable size range of 100 to 1,000 μm. In this size range, the pellets according to the invention meet the various requirements for processing animal feeds, including for example homogeneous incorporability and little if any tendency towards separation. Oversize material and also fines may be returned to the pelletizing stage for producing the auxiliary solution. The product according to the invention is distinguished in particular by compact spherical particles reduced hygroscopicity very good free flow properties a reduced tendency towards agglomeration increased apparent density freedom from dust high mechanical stability an active substance content corresponding to the ratio in the original broth, i.e. a maximum active substance content absence of unwanted additives minimal additional costs by using simple techniques and obtaining high yields.

Accordingly, the product generally has the following advantages over the prior art:

increased apparent density, measured as the product mass of a defined, loosely filled volume, reduced hygroscopicity, measured as the water absorption of a sample in a climatic chamber at room temperature/ 72% relative air humidity after a residence time of 60/120 mins., almost complete absence of fine dust, measured as the percentage which passes through a 100 μm gauze during mechanical sieving and which generally does not exceed 3%, compact and spherical pellets, i.e. substantial absence of voids and porous structures which reduce the density of the pellets in relation to the maximum possible density determined by the physicochemical properties and the absence of sharp edges among the pellets, very good free flow properties, measured as the ability of the product to flow without stopping from a cylindrical vessel with a conically tapering base (internal diameter of the cylinder 40 mm, angle between cylinder wall and cone 150°, i.e. tapering to a point) and a round bottom opening with a maximum diameter of 5 mm.

In one preferred embodiment, only one component, more particularly an amino acid, is predominantly present as active substance in the additive.

An additive such as this may then be universally added to any feed or to premixes in accordance with its active-substance content. With certain feed mixtures, however, it may even be advisable for several components, more particularly amino acids, to be present in a definite ratio to one another in the additive so that the desired enrichment is achieved with a single additive. The ratio between the active substances may be established, for example, by mixing several fermentation broths or additives and also by adding advantageously small quantities of pure active substances, for example amino acids.

According to the invention, suitable amino acids are in particular lysine, threonine, tryptophan and also leucine, isoleucine, valine, proline, arginine and alanine. Chlorotetracycline is particularly suitable as a medication. Apart from a single active substance or several particular active substances, the additive should contain few, if any, other unspecified additives or other additives unsuitable for supplementing.

In the case of amino acids, the supplement's amino acids should make up at least 95% by weight and preferably at least 97% by weight of the total quantity of free amino acids in the supplement.

The total sugar content includes the sugars which can and those which cannot be utilized by the microorganisms and advantageously amounts to at most 8% by weight and, more particularly, to at most 5% by weight. In general, not all the total sugar is consumed in the fermentation process, so that normally at least 0.1% by weight and, in general, even at least 0.5% by weight is present in the product. It is this total sugar component which is present, because the broth is not worked up into the pure product which has burdened known pelletizing processes with the problems which are eliminated by the present invention.

The percentage content of fats and oils is advantageously limited to 3% by weight.

Supplements containing at least 46.5% by weight, better still 49.5% by weight and preferably 50% by weight or more of the required free amino acid(s) are particularly suitable for supplementing. On economic grounds, the upper limit is 60% by weight for basic amino acids and 90% by weight for neutral amino acids.

The additives may be used in the form in which they are obtained in mixtures of such additives (including the broths) or, provided with other additives, may be used as premixes, such as trace element/vitamin premixes or mineral premixes. Compared with isolation in pure form and with known products from fermentation broths, such additives are less expensive despite their high content, are easy to standardize and contain few secondary products despite their low production costs.

The animal feed according to the invention is generally in the form of light beige to brown-beige pellets with an apparent density of 550 to 750 kg/m$^3$. In the case of L-lysine, it is bound in salt-like form, for example as the sulfate or carbonate. It is completely stable; no reduction in the L-lysine content can be detected after storage for 12 months at 25° C. Its hygroscopicity behavior is good. It shows very good flow properties attributable to the compact, spherical form of the pellets, is substantially dust-free, does not show any tendency towards lump formation and may readily be homogeneously incorporated in actual feeds or premixes. It is also highly stable as a constituent of such mixtures. As an L-lysine source, it is at least as effective as the pure L-lysine hydrochloride normally used, based on the same L-lysine content.

The present invention also relates to processes for the production of the animal feed additives.

According to the invention, one process for the production of an animal feed additive is based on a fermentation broth containing a fermentation product and the majority of the other ingredients of the fermentation broth, 0 to 100% of the fermentation biomass being present. In this process the fermentation broth, optionally after partial removal of its ingredients, is spray-dried to form fine particles of which at least 70% by weight have a maximum particle size of 100 μm. The fine particles thus obtained are then built up into pellets containing at least 30% by weight of the fine particles.

In one advantageous embodiment, at least 70% by weight of the pellets are built up to a particle size of ≧100 μm. Pellets such as these contain little dust and may be stably incorporated in feeds. According to the invention, >90% by weight and, in many cases, even >97% by weight generally satisfy this criterion.

In another particularly favorable embodiment, the pellets are built up from the fine particles by addition of water or fermentation broth which optionally contains only part of the ingredients, i.e. for example is reduced in the biomass. The fermentation broth is advantageously used as described above.

The pellets are normally built up with an apparent density of at least 550 kg/m$^3$ which, on the one hand, saves volume and, on the other hand, gives a highly stable product. In addition, the pellets may be built up from the fine particles using high-shear mixing tools which collide with the fine particles and with the pellets being formed and press the pellets firmly together so that stable pellets of high apparent density are again obtained.

To produce the fine particles, a fermentation broth is optionally reduced completely or partly around the biomass, for example by mechanical separation techniques, and the fermentation broth is concentrated to a dry matter content of at most 60% by weight. The concentrate thus obtained is dried, for example in a falling film evaporator, to form a fine-particle powder which normally has an apparent density of 350 to less than 550 kg/m$^3$ and a water content of <5% by weight.

Other typical additives, for example perlite, may be used for the pelletizing process according to the invention providing the features according to the invention are not affected. Such additives are preferably limited to less than 10% by weight in the end product and, more particularly, are present in a quantity of at most 5% by weight. According to the invention, the additives in question may even be used in quantities of less than 1% by weight or omitted altogether.

The fermentation broths used normally have a solids content of 7.5 to 26% by weight and, where amino acids are the active substance, contain the amino acids in quantities of 1 to 20% by weight. Of particular advantage in the case of amino acids are fermentation processes in which at least 40% by weight of the amino acid(s) are present in the dry matter on completion of fermentation. In addition, the fermentation process is operated on a sugar-limited basis at least towards the end, but advantageously over at least 30% of the fermentation time, in other words the concentration of assimilable sugar in the fermentation medium is kept at or reduced to at most 0.3% by weight.

The fermentation broths for amino acid supplements are advantageously prepared by growing a microorganism producing at least one amino acid in a fermentation medium which contains at least one carbon source, at least one nitrogen source, mineral salts and trace elements, the fermentation process being controlled in such a way that a crude fermentation broth with a content of assimilable sugar of at most 4 g/l and, in particular, a solids content of 7.5 to 26% by weight, an amino acid content of 1 to 20% by weight, advantageously 4 to 10.5% by weight, and a sugar content of at most 2.6% by weight is obtained on completion of fermentation.

Using suitable microorganisms, the fermentation process is advantageously carried out in such a way that the dry matter of the fermentation broth contains at most 15% by weight of protein and, in particular, at least 40% by weight of amino acids, at most 8% by weight of carboxylic acids containing less than 8 carbon atoms, at most 10% by weight of total sugar, at most 5% by weight of fats and oils and at most 5 to 30% by weight of minerals. Towards the end of the fermentation process, the content of assimilable sugar is adjusted to at most 1 g/l, i.e. no sugar is added and the fermentation process is only terminated when the assimilable sugar content reaches or falls below that value.

To increase the amino acid content of the dry matter or to standardize the dry matter to a certain amino acid content or to reduce the protein content of the dry matter, the biomass and optionally other substances may be removed by mechanical separation techniques, preferably after the end of the fermentation process, leaving the majority of the remaining components of the fermentation broth intact.

If no biomass is to be removed, the fermentation process should advantageously be carried out in such a way that as little biomass as possible is produced. In this case, the nutrients added should have been largely consumed by the end of fermentation. One such fermentation process is described, for example, in DE-A 41 30 867 (Canadian Patent 2,078,364), Example 3.

The fermentation process is advantageously carried out in such a way that the concentration of assimilable sugar in the fermentation broth amounts to at most 0.3% by weight over at least 30% and preferably over 70% of the fermentation time.

Suitable mutants of the species corynebacterium or brevibacterium, for example the strain lodged and obtainable under the number DSM 5715 in the Deutsche Stammsammlung für Mikroorganismen, were preferably used as the amino acid-producing microorganisms for lysine.

Starch hydrolyzates (glucose) or sucrose are preferably used as the carbon source. A small percentage may also be derived from beet sugar or cane sugar molasses. This percentage should not exceed 5% by weight of the total carbon source (=10% by weight of molasses in the total carbon source).

Suitable mutants of the species *Escherichia coli* are preferably used for threonine and tryptophane, for example the strain BKIIM B-3996 (FR-A 2 640 640 - U.S. Pat. No. 5,175,107) for threonine.

Besides ammonia or ammonium sulfate, hydrolyzates of protein-containing substances, such as corn gluten, soya flour or biomass from a preceding batch or, for example, corn steep liquor or fish peptone, are used as the nitrogen source.

The fermentation temperature is best between 30° and 40° C. while the pH value of the fermentation medium is best between 6.0 and 8.0. The fermentation time is generally at most 100 hours.

On completion of the fermentation process, the microorganisms may be destroyed by heat or by other methods, for example by addition of a mineral acid, such as sulfuric acid.

The biomass is then optionally (partly) removed by known methods, such as separation, decantation, a combination of separation and decantation, ultrafiltration or microfiltration.

The fermentation broth is then thickened by known methods, for example in a thin layer or falling film evaporator, to form a preconcentrate with a solids content of 30 to 60% by weight.

A spray dryer, a spin flash dryer or a fluidized bed dryer, for example, may be used for the final drying of the preconcentrate to form a fine-particle powder with an apparent density of 350 to <550 kg/m$^3$ and a water content of <5% by weight.

If necessary, the fine-particle powder may then be processed to pellets of suitable size with an apparent density of 550 to 850 kg/m$^3$, advantageously with the aid of water, but more especially a concentrated fermentation broth or an aqueous solution of oversize particles or fine dust, either in a pan granulator or in a mixer in the presence or absence of other carriers.

The fermentation broth advantageously has a solids content as binder of 40 to 65% by weight and, more particularly, 50 to 60% by weight. Lysine fermentations in particular, but also fermentations of the other amino acids, can be pelletized particularly effectively with such solids contents.

If the animal feed according to the invention is to be standardized in regard to its amino acid content, this may be done for example by suitably selecting the quantity of remaining biomass and/or by suitably mixing the preconcentrates or the dried powder. Biomass-free or biomass-reduced broths may also be correspondingly mixed with original broths for standardization. Another possibility is to add small quantities of safe feed additives, such as wheat bran, corncob meal or perlite.

The animal feed additives according to the invention, product and process product, are used for supplementing or producing an animal feed or premix for animal feeds. Accordingly, the present invention also relates to an animal feed or premix containing an animal feed additive according to the invention.

DETAILED DESCRIPTION OF PREFERRED EMBODIMENTS

The invention is illustrated by the following Examples.

EXAMPLE 1

150 kg of a sterile aqueous solution having the following composition were introduced into a fermentation tank equipped with a stirrer and aeration system:

| | |
|---|---|
| Water | 132.0 kg |
| Molasses | 0.8 kg |
| Sucrose | 3.7 kg |
| Corn gluten hydrolyzate containing sulfuric acid | 9.2 kg |
| Ammonium sulfate | 1.5 kg |
| Mineral salts trace elements | 0.4 kg |

Adjusted with an ammonia solution to pH 7.5

15 Liters of an inoculation culture of a corynebacterium grown in the same fermentation medium, but in a separate fermentation tank were added to the solution at 33° to 35° C.

78 Liters of a sterile solution with the following composition (before neutralization to pH 7.5) were then added over a period of 42 h:

| | |
|---|---|
| Water | 37.0 kg |
| Molasses | 2.5 kg |
| Sucrose | 43.0 kg |
| Corn gluten hydrolyzate containing sulfuric acid | 8.2 kg |
| Ammonium sulfate | 0.9 kg |
| Mineral salts and Trace elements | 0.2 kg |

Over the entire fermentation period, the pH value was kept between 7.0 and 7.5 with ammonia solution. The stirrer speed was adjusted to 600 r.p.m. and the aeration rate to between 0.5 and 0.7 vvm.

252 kg of a crude fermentation broth with a solids content of 31.2 kg, a content of L-lysine base of 13.7 kg and a sugar content of 0.6 kg were obtained at the end of the fermentation period.

The microorganisms were destroyed by heat and the fermentation broth was thickened under reduced pressure to a solids content of about 52% by weight in a falling film evaporator.

The preconcentrate was then dried in a spray dryer with an integrated fluidized bed to form a light brown-beige powder with an apparent density of 0.5 kg/l and the following composition:

| | |
|---|---|
| L-lysine base | 44.7% by weight |
| Other α-amino acids | 1.2% by weight |
| Proteins | 14.5% by weight |

-continued

| | |
|---|---|
| Carboxylic acids containing less than 8 carbon atoms | 5.2% by weight |
| Sugars | 1.9% by weight |
| Fats and oils | 3.5% by weight |
| Minerals | 20.2% by weight |
| Water | 4.1% by weight |

Basically, any fine particles conventionally obtained, for example from a lysine fermentation broth by spray drying, may be used instead of the product obtained as described above.

2.5 kg of the fine particles were then introduced into an EIRICH intensive mixer (type R 02, internal volume 10 liters) equipped with a Sternwirbler ("star whirler") (5000 r.p.m.). 550 ml of a suspension of the same fine particles in water (concentration of the suspension 55% w/w) were then added. After 5 minutes, pelletizing is terminated and the product is dried in a recirculating air drying cabinet.

| | Starting product | Pellets |
|---|---|---|
| Technical data: | | |
| Water absorption (72/% rel. humidity) after 60/120 mins [%]: | 1.24/2.59 Sticks | 0.81/1.75 Flows |
| Apparent density [kg/m³]: | 500 | 700 |
| Sieve analysis [%] | | |
| <100 μm: | 82 | 1 |
| >1000 μm: | 0 | 8 |
| Flowability*: | 6 | 2 |

(*: 1 = excellent, 2 = very good, 6 = non-existent)

Yield of pellets after sieving 100–1000 μm: >90%.

EXAMPLE 2

150 kg of a sterile solution with the following composition were introduced into a fermentation tank equipped with a stirrer and aeration system:

| | |
|---|---|
| Water | 130 liters |
| Glucose | 12.4 kg |
| Corn gluten hydrolyzate containing sulfuric acid | 9.0 kg |
| Ammonium sulfate | 1.5 kg |
| Mineral salts and Trace elements | 0.4 kg |

Adjusted with an ammonia solution to a pH value of 7.5.

12 l of an inoculation culture of a corynebacterium grown in the same fermentation medium, but in a separate fermentation tank were then added to the solution at 33° to 35° C.

77 l of a sterile solution with the following composition (before neutralization to pH 7.5) were added over a period of 40 hours:

| | |
|---|---|
| Water | 38 liters |
| Glucose | 40.0 kg |
| Corn gluten hydrolyzate containing sulfuric acid | 8.3 kg |
| Ammonium sulfate | 0.9 kg |
| Foam inhibitor (Nalcou) | 0.08 kg |
| Mineral salts and Trace elements | 0.2 kg |

Over the entire fermentation period, the pH value was kept between 7.0 and 7.5 with ammonia solution. The stirrer speed was adjusted to 600 r.p.m. and the aeration rate to between 0.5 and 0.7 vvm.

275 kg of a crude fermentation broth with a solids content of 34.1 kg, a content of L-lysine base of 15.5 kg and a sugar content of 0.71 kg were obtained at the end of the fermentation period. The microorganisms were destroyed by heat and removed in a combined separator/decanter.

The broth freed from the biomass was thickened under reduced pressure to a solids content of approximately 52% by weight in a falling film evaporator.

The preconcentrate obtained was then dried in a spray dryer to form a light brown-beige powder with an apparent density of 0.51 kg/l and the following composition:

| | |
|---|---|
| L-lysine base | 51.2% by weight |
| other α-amino acids | 2.5% by weight |
| Proteins | 8.8% by weight |
| Carboxylic acids containing less than 8 carbon atoms | 6.8% by weight |
| Sugars | 2.4% by weight |
| Fats and oils | 2.5% by weight |
| Minerals | 21.1% by weight |
| Water | 1.6% by weight |

The fine-particle powder is granulated in the same way as in Example 1 in a mixer with high-shear mixing tools using the preconcentrate as binder. A dust-free product with a particle size of >80% <1 mm and an apparent density of 0.65 kg/l was obtained.

EXAMPLE 3

Fermentation was carried out in the same way as in Example 2 except that the pure sulfuric acid corn gluten hydrolyzate was replaced by a mixture of 3.5 kg of sulfuric acid corn gluten hydrolyzate and 13.8 kg of sulfuric acid hydrolyzate of the biomass removed in Example 2.

272 kg of a crude fermentation broth with a solids content of 36.2 kg, a content of L-lysine base of 17.1 kg and a sugar content of 0.55 kg were obtained at the end of the fermentation period.

The biomass was removed by ultrafiltration (≦300,000 dalton) without any pretreatment. The broth freed from the biomass was thickened as in Example 2 to a solids content of approximately 53% by weight.

Part of the preconcentrate obtained was then dried in a fluidized bed dryer to form a light brown-beige powder with an apparent density of 0.53 kg/l and the following composition:

| | |
|---|---|
| L-lysine base | 62.1% by weight |
| Other α-amino acids | 1.2% by weight |
| Proteins | 2.6% by weight |
| Carboxylic acids containing less than 8 carbon atoms | 3.1% by weight |
| Sugars | 2.0% by weight |
| Fats and oils | 1.7% by weight |
| Minerals | 24.4% by weight |
| Water | 1.6% by weight |

Corncob meal was added to another part of the preconcentrate before drying in the fluidized bed dryer in such a quantity that the solid product obtained had a standardized content of L-lysine base of 60% by weight.

EXAMPLE 4

A threonine animal feed supplement is obtained as follows:

A fermentation broth containing 85 g/l L-threonine is prepared as described in FR-A 2 640 640 (U.S. Pat. No. 5,175,107) by cultivation of the strain *Escherichia coli* BKIIM B-3996 in a fermentation medium.

The biomass from the genetically modified microorganism is then removed by ultrafiltration and the broth freed from the biomass is pelletized as in Example 1 in a fluidized bed dryer or by spray drying and pelletizing of the fine particles.

EXAMPLE 5

A conventionally obtained threonine fermentation broth is dried in a spray dryer to form a dry fine powder.

2.5 kg of this product are introduced into an EIRICH intensive mixer (type R 02, internal volume 10 liters) equipped with a Sternwirbler ("star whirler") (5000 r.p.m.). 375 ml of suspension of the same product in water are then added (concentration of the suspension 45% w/w). After 15 minutes, pelletizing is terminated and the product is dried in a recirculating air drying cabinet

|  | Starting product | Pellets |
| --- | --- | --- |
| Technical data: |  |  |
| Water absorption (72/% rel. humidity) after 60/120 mins [%]: | No significant differences because the fine particles are substantially non-hygroscopic | |
| Apparent density [kg/m³]: | 530 | 830 |
| Sieve analysis [%] |  |  |
| <100 μm: | 97 | 2 |
| >1000 μm: | 0 | 9 |
| Flowability*: | 6 | 2 |

(*: 1 = excellent, 2 = very good, 6 = non-existent)
Yield of pellets after sieving 100–1000 μm: >88%.
Threonine 52.0% by weight
HO 2.5% by weight

EXAMPLE 6

A conventionally obtained chlorotetracycline fermentation broth containing 17% by weight dry matter is dried in a spray dryer to form a dry fine powder.

2.5 kg of this product are introduced into an EIRICH intensive mixer (type R 02, internal volume 10 liters) equipped with a Sternwirbler ("star whirler") (5000 r.p.m.). 800 ml of water are then added. After 13 minutes, pelletizing is terminated and the product is dried in a recirculating air drying cabinet.

|  | Starting product | Pellets |
| --- | --- | --- |
| Technical data: |  |  |
| Water absorption (72/% rel. humidity) after 60/120 mins [%]: | 1.47/3.03 Sticks | 1.00/2.26 Flows |
| Apparent density [kg/m³]: | No significant improvement because the fine particles are already very compact | |
| Sieve analysis [%] |  |  |
| <100 μm: | 84 | 1 |
| >1000 μm: | 0 | 6 |
| Flowability*: | 6 | 2 |

(*: 1 = excellent, 2 = very good, 6 = non-existent)
Yield of pellets after sieving 100–1000 μm >90%.
Chlorotetracycline HCl 13.7% by weight
HO 3.8% by weight

What is claimed is:

1. Animal feed additive pellets having a bulk density of at least 550 Kg/m³, a grain size where 90% by weight is not greater than 1 mm and less than 10% by weight is smaller than 100 μm and a composition which comprises,

|  | amino acids | 40–90% by weight |
| --- | --- | --- |
|  | proteins | 0.5–20% by weight |
|  | carboxylic acids containing less than 8 carbon atoms | max 13% by weight |
|  | total sugar | max 10% by weight |
|  | fats and oils | max 6% by weight |
| and | minerals | 3% by weight, | wherein the pellets are formed by intensive mixing of fine particles, having a size for at least 70% by weight of the fine particles which is smaller than 100 μm, with a binder selected from the group consisting of water and fermentation broth, and wherein the fine particles are obtained by directly spray drying a fermentation broth containing amino acid(s) and biomass, which fermentation broth is obtained by cultivating a bacteria in a fermentation medium containing an assimilable sugar selected from the group consisting of starch hydrolyzates, sucrose, heat sugar and cane sugar molasses under sugar limiting conditions where the assimilable sugar concentration is kept at or reduced to at most 0.3% by weight fine particles which is smaller than 100 μm, and 3) building up using intensive mixing the fine particles with a binder selected from the group of water and fermentation broth to form pellets containing at least 30% by weight of the amino acid and having a grain size where 90% by weight is not greater than 1 mm and less than 10% by weight is smaller than 100 μm.

2. A process for the production of pelletized animal feed additive pellets, having a bulk density of at least 550 kg/m³ and containing at least 33% by weight of a fermentatively produced amino acid, consisting essentially of, 1) growing a bacteria in a fermentation medium containing an assimilable sugar selected from the group consisting of starch hydrolyzates, sucrose, beet sugar and cane sugar molasses under sugar-limiting conditions where the assimilable sugar concentration in the fermentation medium is kept at or reduced to at most 0.3% by weight until a fermentation broth containing the amino acid and biomass is formed, 2) spray drying the fermentation broth to form at least 70% by weight fine particles having a particle size for at least 70% by weight of the fine particles which is smaller than 100 μm, and 3) building up using intensive mixing the fine particles with a binder selected from the group of water and fermentation broth to form pellets containing at least 30% by weight of the amino acid and having a grain size where 90% by weight is not greater than 1 mm and less than 10% by weight is smaller than 100 μm.

3. The animal feed additive pellets as set forth in claim 1 wherein the intense mixing is high shear mixing.

4. The animal feed additive pellets as claimed in claim 1 which contains chlortetracycline or an amino acid, as additive.

5. The animal feed additive pellets as claimed in claim 4 in which the amino acid is selected from the group consisting of lysine, threonine and tryptophan.

6. The animal feed additive pellets as claimed in claim 1, in which at least one of the following components lies within the range indicated:

| | |
|---|---|
| Amino acid(s) | 40–82% by weight |
| Proteins | 10–16% by weight |
| Carboxylic acids containing fewer than 8 carbon atoms | max. 8% by weight |
| Total sugar | 2–10% by weight |
| Minerals | 5–25% by weight. |

7. A process as set forth in claim 2 including removing a portion of the ingredients of the fermentation broth before spray drying.

8. A process as claimed in claim 2 in which the fine particles are built up to the pellets with high-shear mixing tools.

9. In an animal feed containing additives wherein the improvement comprises the animal feed additive pellets set forth in claim 1.

* * * * *